Patented Feb. 20, 1934

1,948,224

UNITED STATES PATENT OFFICE 1,948,224

AZO-DYESTUFFS AND PROCESS OF MAKING SAME

Emil Eduard Misslin, Basel, and Rudolf von Capeller, Binningen, near Basel, Switzerland, assignors to Society of Chemical Industry in Basle, Basel, Switzerland No Drawing. Application February 23, 1933, Serial No. 658,240, and in Switzerland February 25, 1932

18 Claims. (Cl. 260—72)

The present invention relates to the manufacture of new azo-dyestuffs which are valuable for the production of fast tints on various fibres. It comprises the new dyestuffs, the process of making same, as well as the material dyed with the new products.

It has been found that the diacyl-diamino-hydroxy-naphthalenes of the general formula

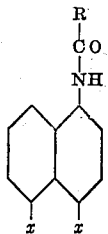

wherein R stands for hydrogen, alkyl or aryl, $x$ in one case stands for an NH—CO—$y$-group, $y$ being hydrogen, alkyl or aryl, and in the other case for an OH-group, may be converted into new, valuable azo-dyestuffs by uniting them with diazo-compounds.

The products of the above general formula may be obtained by reducing the dyestuffs obtained by coupling 1:5-aminonaphthol or the derivatives thereof, which may be coupled in the 4-position to the amino-group, in an acid medium, or by coupling 1:8-aminonaphthol or its derivatives which may be coupled in the 5-position, and acylating the diamino-products thus obtained, the dyestuffs obtained from 1:5-aminonaphthol and its derivatives leading to 1:4-diacyl-diamino-8-hydroxy-naphthalenes, and the dyestuffs obtained from 1:8-aminonaphthol leading to 1:5-diacyl-diamino-8-hydroxynaphthalenes.

The dyestuffs thus obtained correspond to the general formula

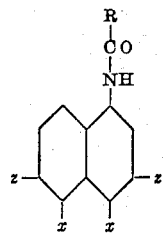

wherein R and the two $x$ have the above mentioned significations, the $z$ standing in ortho-position to the NH—CO—$y$ group represents a hydrogen atom, and the $z$ standing in ortho-position to the OH-group represents an $R_1$—N=N-radicle, $R_1$ being the aromatic radicle of any diazo-compound.

These products constitute in a dry state dark powders which yield on textiles red to violet to blue and green tints.

According to the position of any sulfonic acid group or groups which may be present in the naphthalene nucleus, the nature of the acylating agent and the diazo-component used, very varied azo-dyestuffs can be obtained.

For example, by acylating 1:4-diamino-8-hydroxy-naphthalene-6-sulfonic acid with an aliphatic acylating agent, such as acetic anhydride, there are produced as a rule, by subsequent coupling with simple diazo-compounds, acid dyestuffs which dye evenly.

By using aromatic acylating agents, such as benzoyl chloride or the nitro-derivatives thereof, there may be produced compounds which are characterized by their affinity for vegetable fibres. These may be used for making direct dyeing dyestuffs suitable for dyeing vegetable fibres, such as cotton or artificial silk from regenerated cellulose, like viscose silk, particularly for making dyestuffs which are further developed on the fibre.

Owing to their affinity for the fibre the new diacyl-compounds are suitable for making the so-called ice-colors, since the fibre padded with the acyl-compound can be developed by means of a suitable diazo-compound.

The following examples illustrate the invention, the parts being by weight:—

Example 1

50 parts of 1-amino-5-hydroxynaphthalene-7-sulfonic acid are suspended in 600 parts of hot water and dissolved by the addition of 125 parts of a sodium carbonate solution of 10 per cent. strength. At 20°-30° C. 35 parts of a sodium hydroxide solution of 28 per cent. strength are added by drops and the whole is cooled to 0° C. to —4° C. In the course of ¼ to ½ hour there are added by drops 35 parts of a sodium hydroxide solution of 28 per cent. strength and 35 parts of acetic anhydride, so that the solution is always alkaline. When the acetylation is complete the solution is acidified feebly with acetic acid and there is run in a diazo-solution previously prepared from one equivalent of aniline in the usual manner. This mixture is stirred without further addition over-night. The dyestuff which has nearly completely separated is filtered and suspended in 700 parts of hot water. At 70° C. there are added gradually, while stirring, 75 parts of a sodium hydroxide solution of 28 per cent. strength; after about ¼ hour the saponification is complete. 55 parts of sodium bicarbonate are stirred into the cooled mass and the saponified monoazo-dyestuff which has separated is filtered.

The dyestuff from the filtrate is introduced into a mixture of 150 parts of stannous chloride solution (SnCl₂·HCl, 61.7 per cent. strength) and 450 parts of hydrochloric acid of 10 per cent. strength. The whole is heated gradually to 60–70° C. and stirred until it has become decolorized. When cold the precipitate is filtered and washed, first with about 200 parts of hydrochloric acid of 10 per cent. strength and then with about 300 parts of water. The 1:4-diamino-8-hydroxynaphthalene-7-sulfonic acid derivative thus obtained is very sparingly soluble in acidified water and is stable therein, but the free base is remarkably sensitive to air and to oxidizing agents in general. This 1:4-diamino-5-hydroxynaphthalene-7-sulfonic acid derivative is suspended in 1000 parts of water and the mixture is heated to 60–70° C. Sodium carbonate is now added until the solution is feebly alkaline and then there are quickly added 50 parts of acetic anhydride and cautiously, within about ½ hour, 45 parts of calcium carbonate. After cooling and filtering, the filtrate is mixed with sodium carbonate and filtered from the calcium carbonate which has been precipitated. By acidifying this second filtrate with acetic acid and adding sodium chloride, the diacetyl-1:4-diamino-8-hydroxynaphthalene-6-sulfonic acid is isolated.

Example 2

66 parts of the 1:4-diamino-8-hydroxynaphthalene-6-sulfonic acid derivative, obtainable by reducing various dyestuffs (see Example 1), are suspended in 1000 parts of water and the mixture is heated to 50–60° C. and cautiously neutralized with sodium carbonate. There are then added 50 parts of calcium carbonate and 94 parts of meta-nitrobenzoylchloride are introduced in small doses. The calcium salt of 3':3''-dinitrodibenzoyl-1:4-diamino-8-hydroxynaphthalene-6-sulfonic acid is precipitated and, after cooling, the whole is filtered. This calcium salt is stirred into 2000 parts of hot water and converted by means of sodium carbonate into the soluble sodium salt of 3':3''-dinitro benzoyl-1:4-diamino-8-hydroxynaphthalene-6-sulfonic acid. After filtering hot, the filtrate is allowed to cool and by addition of sodium chloride the said sodium salt is isolated. If instead of the meta-nitrobenzoylchloride the para-nitrobenzoylchloride is used, the nitrobenzoylation is preferably conducted at 75–85° C.

For reducing the sodium 3':3''- or 4':4''-dinitrodibenzoyl-1:4-diamino-8-hydroxynaphthalene-6-sulfonate, 115 parts of the salt are dissolved in about 2000 parts of hot water. This solution is allowed to run gradually into a mixture of 1000 parts of water, 300 parts of iron turnings and 30 parts of acetic acid contained in a reflux apparatus and kept in ebullition while well stirring. When the whole has been added, boiling is continued for ½ hour and then sodium carbonate is added until all the iron has been precipitated, the precipitate being filtered hot. The filtrate is acidified with acetic acid and by addition of sodium chloride the 3':3''- or 4':4''-diaminodibenzoyl-1:4-diamino-8-hydroxynaphthalene-6-sulfonic acid is precipitated.

Example 3

34 parts of the diacetyl-1:4-diamino-8-hydroxynaphthalene-6-sulfonic acid, obtained as described in Example 1, in the form of its sodium salt in neutral solution, are coupled with a diazo-solution which is ammoniacal or alkaline with sodium carbonate and has been obtained from one equivalent of aniline or ortho-anisidine in the usual manner. Coupling occurs very quickly and the dyestuff which has separated is filtered and dried. It dyes wool in an acid bath vivid red or violet tints.

The sodium salts of the new dyestuffs obtained according to the above examples correspond to the general formula

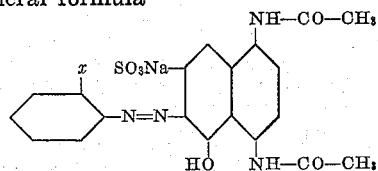

wherein $x$ stands for hydrogen or $OCH_3$.

Similar shades show the dyestuffs in which the acetyl radicle is replaced by other acyl radicles, such as, for example, formyl, propionyl, benzoyl radicles etc. Red dyeing dyestuffs are also obtained with diazobenzene or diazoanisol and 1:4-dibenzoyl-diamino-5-hydroxynaphthalene-2-sulfonic acid.

Similar dyestuffs are obtained by coupling the dibenzoyl-1:5-diamino-8-hydroxynaphthalene with diazotized sulfanilic acid or 1-amino-2-methoxybenzene-5-sulfonic acid.

Example 4

30.3 parts of β-naphthylamine-disulfonic acid-2:4:8 are diazotized in the usual manner, coupled with α-naphthylamine, further diazotized and the diazo-compound of the monoazo-dyestuff is isolated by salting out, if necessary, and filtration. This diazo-compound is suspended in about 400 parts of water and run into a cold solution of 50 parts of 3':3''- or 4':4''-diaminodibenzoyl-1:4-diamino-8-hydroxynaphthalene-6-sulfonic acid and 35 parts of sodium carbonate in about 500 parts of water. When coupling is complete, the whole is heated to 70–80° C. and the disazo-dyestuff which has separated is filtered hot. The direct-dyeing cotton dyestuffs thus obtained, the sodium salts of which very probably correspond with the general formula

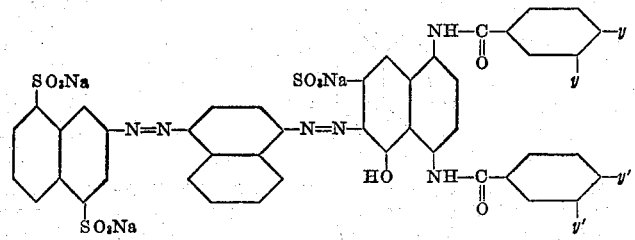

wherein $y$ and $y'$ in one case stand for hydrogen and in the other case for an amino-group, dye blue tints capable of further development on the fibre. Remarkable are the green tints which can be obtained with the aid of so-called yellow components, for instance pyrazole derivatives, arylides of acetoacetic acid, benzoylacetone or the like. Thus, for example, the combination obtained from the 3':3''- or 4':4''-diaminodibenzoyl-1:4-diamino-8-hydroxynaphthalene-6-sulfonic acid yields by development on the fibre with 1-phenyl-3-methyl-5-pyrazolone a green of great purity. Similar tints are obtained when, instead of the 2-naphthylamine-4:8-disulfonic acid there is used 1-amino-8-toluenesulfhydroxynaphthalene-3:6-disulfonic acid, and the disazo-dyestuff is heated to 60–70° C. with a sodium hydroxide solution of 2 per cent. strength for about ¼ hour, so as to saponify the toluene-sulfonic acid ester. These dyestuffs also yield, when diazotized on the fibre and coupled with the aforesaid yellow components, green dyeings which are characterized by their fastness to light.

Similar dyestuffs are formed if the 2-naphthylamine-4:8-disulfonic acid is replaced by another starting component, such as the 1-aminonaphthalene-4:7-disulfonic acid, the 1-aminonaphthalene-4- or 5-sulfonic acid, or a sulfonated diazo-compound of the benzene series. The α-naphthylamine may be replaced by the 1-aminonaphthalene-6- or 7-sulfonic acid, or by the ether of a 1-amino-2- or 7-hydroxynaphthalene as middle component. Also middle components of the benzene series, such as cresidine, for example, may be used. Quite generally it may be observed that the introduction of a benzene derivative as a starting or as a middle component will lead to redder or, respectively, bluer dyeing products, whereas the use of ethers of the 1-amino-2-hydroxy-naphthalene as a middle component leads to greener dyeing products. Thus, the diazo-compound of the amino-azobenzene-disulfonic acid leads to a dyestuff dyeing violet, whereas the dyestuff from diazotized 4'-amino-2'-methoxy-5'-methyl-azobenzene-3-sulfonic acid dyes cotton reddish blue.

Blue dyeing dyestuffs, which by diazotizing and suitable coupling on the fibre with so called yellow components yield green dyeings, are also obtained if the diacyl-diamino-hydroxynaphthalene of the general formula

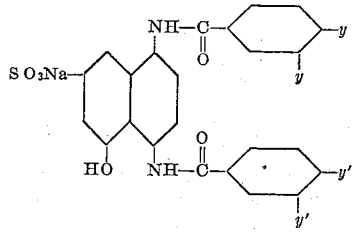

wherein y and y' in one case stand for hydrogen and in the other case for an NH₂-group, instead of being coupled with such diazo-compounds which correspond to the general formula

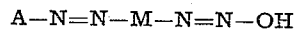

A—N=N—M—N=N—OH wherein A stands for the radicle of one of the above mentioned starting components, and M for the radicle of one of the above mentioned middle components, is united with such diazo-compounds which correspond to the general formula

A—N=N—M—N=N—M—N=N—OH wherein A and the two M's have the above mentioned significations.

The term middle component is to be understood to mean such primary aromatic amines of the benzene and naphthalene series which are capable of coupling in the 4-position to the amino-group, with formation of further diazotizable azo-dyestuffs.

*Example 5*

To a cold solution of 14 parts of 1-amino-5-acetoxynaphthalene-7-sulfonic acid in 200 parts of water, prepared as described in Example 1, there is added a diazo-solution made from one equivalent of 2-naphthylamine-5-sulfonic acid in the usual manner; after a time the mixture is neutralized with sodium acetate and stirred overnight. After cooling to 5–10° C. there is added the hydrochloric acid necessary for diazotizing and, while stirring, there are dropped in 25 parts of a 2N-solution of sodium nitrite. The diazo-compound of the monoazo-dyestuff is precipitated without salting out and can be filtered rather well. It is stirred in 1000 parts of water and the suspension is run into a solution of 25 parts of 3':3''- or 4':4''-diamino-dibenzoyl-1:4-diamino-8-hydroxynaphthalene-6-sulfonic acid, which has been made alkaline with sodium carbonate. When coupling is complete there is added the quantity of sodium hydroxide solution required for making a liquor containing 2 per cent. of hydroxide and the whole is warmed for a quarter of an hour to 40–50° C. so as to saponify the acetyl-group. Neutralization with acetic acid, heating to 70–80° C. and salting out of the saponified disazo-dyestuff follow; the latter is filtered hot and dried at 60° C.

There are obtained direct-dyeing dyestuffs of blue tints which can be developed on the fibre to green dyeings by treatment with yellow components.

The sodium salts of these dyestuffs very probably correspond with the general formula

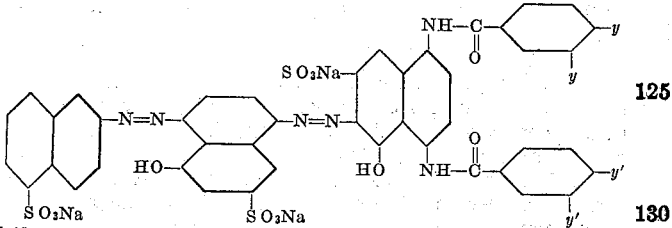

wherein y and y' in one case stand for hydrogen and in the other case for an amino-group.

*Example 6*

23.7 parts of 1-amino-8-toluenesulphhydroxy-naphthalene-3:6-disulfonic acid are dissolved in 600 parts of water and the solution is cooled to 0° C. There are then added 12 parts of hydrochloric acid of 30 per cent. strength and, while stirring well, there are run in beneath the surface of the liquid 17.5 parts of a sodium nitrite solution of 20 per cent. strength. When diazotizing is complete there is added a solution of 7.2 parts of α-naphthylamine in the form of its hydrochloride. Coupling proceeds without further addition very well and stirring is continued over-night. By addition of 8 parts of sodium carbonate and 40 parts of a sodium hydroxide solution of 4 per cent. strength, the monoazo-dyestuff thus formed is dissolved and there are introduced 17.5 parts of a sodium nitrite solution of 20 per cent. strength, and the whole is diazotized indirectly at 0–5° C. by introducing quickly 30 parts of hydrochloric acid of 30 per cent. strength while stirring well. Stirring is then continued for 2 hours at 10–15° C. and the diazo-compound which has separated is filtered and suspended in 1000 parts of ice-water. To the suspension there is added a solution of 11.2 parts of a mixture of 1-naphthylamine-6-sulfonic acid and 1-naphthylamine-7-sulfonic acid, both dissolved in water in the form of their sodium salts. The whole is neutralized with sodium acetate and stirred over-night. The disazo-dyestuff thus obtained is salted out, filtered and suspended in ice-water. There is then added a sodium hydroxide solution until the disazo-dyestuff has dissolved and the solution is indirectly diazotized by means of the calculated proportion of sodium nitrite and hydrochloric acid. After 2 hours the diazotizing is complete and the diazo-compound is salted out, filtered and thoroughly suspended in ice-water. This diazo-compound of the disazo-dyestuff is run into a cold solution of 24.6 parts of 3':3''- or 4':4''-diaminodibenzoyl-1:4-diamino-8-hydroxynaphthalene-6-sulfonic acid and 15 parts of sodium carbonate in 500 parts of water, and the mixture is stirred for some hours. When coupling is complete, the trisazo-dyestuff is salted out, filtered and stirred in 500 parts of sodium hydroxide solution of 2 per cent. strength. For saponifying the toluene-sulfonic acid ester this mixture is heated for about ¼ hour at 60–70° C. It is then neutralized with acetic acid and the precipitated saponified trisazo-dyestuff is filtered. There are obtained direct dyeing cotton dyestuffs of blue tint, the sodium salts of which very probably correspond with the general formula

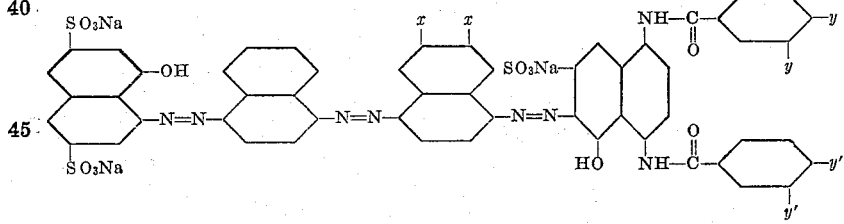

wherein $x$ in one case stands for hydrogen and in the other for an SO₃Na-group, and $y$ and $y'$ in one case stand for hydrogen and in the other for an amino-group, which can be further developed on the fibre as stated in the previous examples. By treatment with so-called yellow components also green tints are obtained.

In this example the middle component (the mixture of the 1-naphthylamino-6-sulfonic acid and the 1-naphthylamine-7-sulfonic acid) may be replaced by the other middle components mentioned in the Examples 4 and 5.

The 3':3''- or the 4':4''-diaminodibenzoyl-1:4-diamino-8-hydroxynaphthalene-6-sulfonic acid also lead to cotton dyestuffs with less complicated diazo-compounds, for example sulfonic acids of the diazotizable mononuclear amines of the benzene, naphthalene or acenaphthene series.

*Example 7*

Cotton yarn is impregnated for ½ hour at about 20–25° C. with 20 times its weight of a solution of 6 grams of 3':3''-dinitrodibenzoyl-1:4-diamino-8-hydroxynaphthalene-6-sulfonic acid, 10 cc. of caustic soda solution of 34° Bé. and 7 cc. of Turkey red oil per litre; it is then wound off and developed in a solution of 2 grams per litre of diazotized meta-nitro-para-toluidine, neutralized with sodium acetate. There is produced a pure lilac of very good properties of fastness.

If in this example there is used instead of the diazo-component named the 4-amino-4'-ethoxy-diphenylaniline there is obtained a dye yielding a pure bluish-grey of equally good properties of fastness.

Like results are obtained with 3':3''-dinitrodibenzoyl-1:4-diamino-6-hydroxynaphthalene - 8- sulfonic acid.

Valuable dyeings are also obtained with unsulfonated compounds, such as 1:4- or 1:5-dibenzoyl-diamino-8-hydroxynaphthalene.

To carry out this invention the various diazo-compounds which have been recommended for the production of fast tints on the fibre by means of arylides of the 2:3-hydroxynaphthoic acid may be used. These are unsulfonated diazo-compounds of the benzene, naphthalene, diphenyl and anthraquinone series, further amino-azo-dyestuffs, diamino-azo-dyestuffs, etc.

What we claim is:—

1. Process for the production of new azo-dyestuffs, consisting in uniting aromatic diazo-compounds with diacyl-diamino-hydroxynaphthalenes of the general formula

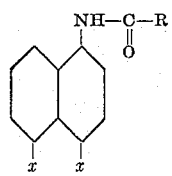

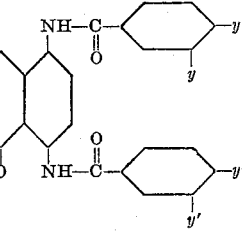

wherein R stands for hydrogen, alkyl or aryl, and $x$ in one case stands for an NH—CO—$y$-group, $y$ being hydrogen, alkyl or aryl, and in the other case for an OH-group.

2. Process for the production of new azo-dyestuffs, consisting in uniting aromatic diazo-compounds with diacyl-diamino-hydroxynaphthalenes of the general formula

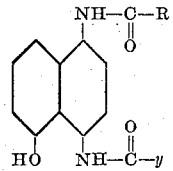

wherein R and $y$ stand for hydrogen, alkyl or aryl.

3. Process for the production of new azo-dyestuffs, consisting in uniting aromatic diazo-compounds with diacyl-diamino-hydroxynaphthalenes of the general formula.

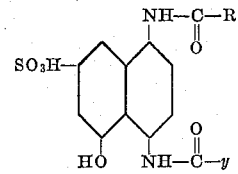

wherein R and $y$ stand for hydrogen, alkyl or aryl.

4. Process for the production of new azo-dyestuffs, consisting in uniting aromatic diazo-compounds with diacyl-diamino-hydroxynaphthalenes of the general formula

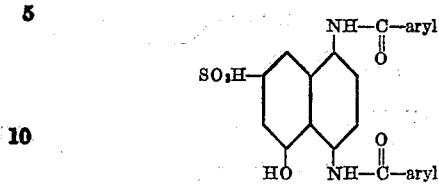

5. Process for the production of new azo-dyestuffs, consisting in uniting aromatic diazo-compounds with diacyl-diamino-hydroxynaphthalenes of the general formula

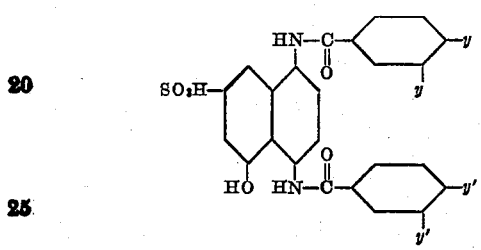

wherein $y$ and $y'$ in one case stand for hydrogen and in the other case for an $NH_2$-group.

6. Process for the production of new azo-dyestuffs, consisting in uniting aromatic diazo-azo-compounds with diacyl-diamino-hydroxynaphthalenes of the general formula

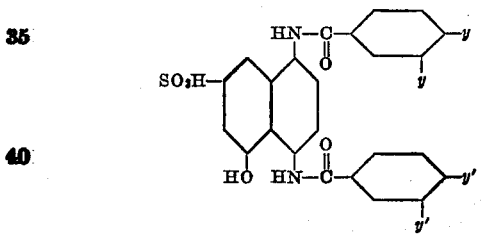

wherein $y$ and $y'$ in one case stand for hydrogen and in the other case for an $NH_2$-group.

7. Process for the production of new azo-dyestuffs, consisting in uniting diazo-azo-compounds of the general formula

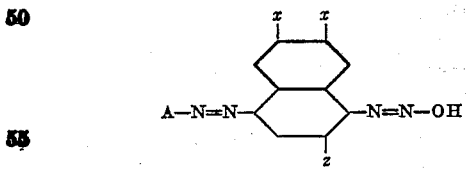

wherein A stands for the radicle of a diazo-compound, $x$ in one case stands for hydrogen and in the other for hydrogen or a sulfonic group, and $z$ for hydrogen or an O-alkyl-group, with diacyl-diamino-hydroxynaphthalenes of the general formula

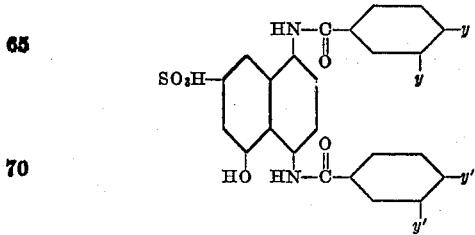

wherein $y$ and $y'$ in one case stand for hydrogen and in the other case for an $NH_2$-group.

8. Process for the production of new azo-dyestuffs, consisting in uniting diazo-azo-compounds of the general formula

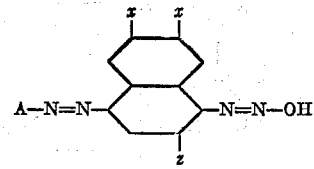

wherein A stands for a sulfonated naphthalene radicle, $x$ in one case stands for hydrogen and in the other for hydrogen or a sulfonic group, and $z$ for hydrogen or an O-alkyl-group, with diacyl-diamino-hydroxynaphthalenes of the general formula

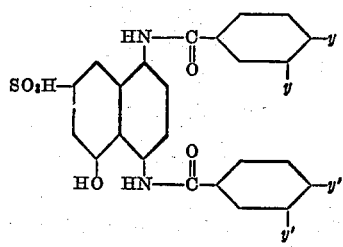

wherein $y$ and $y'$ in one case stand for hydrogen and in the other case for an $NH_2$-group.

9. Process for the production of new azo-dyestuffs, consisting in uniting a diazo-compound of the formula

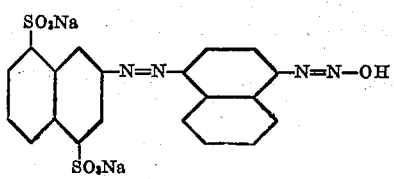

with diacyl-diamino-hydroxynaphthalenes of the general formula

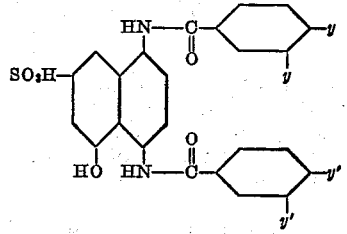

wherein $y$ and $y'$ in one case stand for hydrogen and in the other case for an $NH_2$-group.

10. Process for the production of new azo-dyestuffs, consisting in uniting diazo-compounds of the general formula

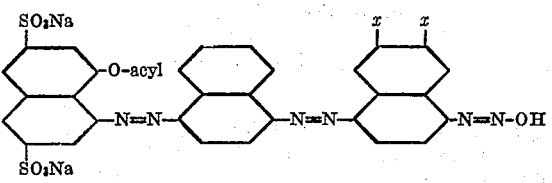

wherein $x$ in one case stands for hydrogen and in the other case for a sulfonic group, with diacyldiamino-hydroxynaphthalenes of the general formula

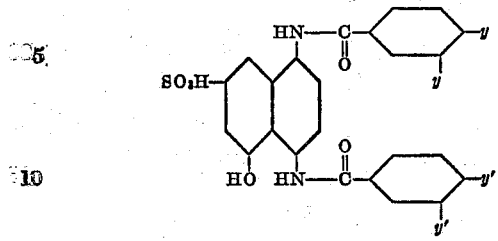

wherein $y$ and $y'$ in one case stand for hydrogen and in the other case for an $NH_2$-group.

11. The azo-dyestuffs of the general formula

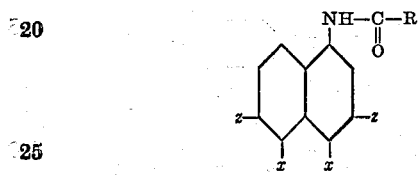

wherein R stands for hydrogen, alkyl or aryl, $x$ in one case stands for an $NH-CO-y$-group, $y$ being hydrogen, alkyl or aryl, and in the other case for an OH-group, wherein further the $z$ standing in ortho-position to the $NH-CO-y$-group represents a hydrogen atom, and the $z$ standing in ortho-position to the OH-group represents an $R_1-N=N=$ radicle, $R_1$ being the aromatic radicle of any diazo-compound, which products constitute dark powders which dye textiles red to blue and green tints.

12. The azo-dyestuffs of the general formula

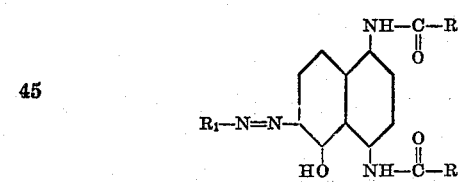

wherein R stands for hydrogen, alkyl or aryl, and $R_1$ for the aromatic radicle of a diazo-compound, which products constitute dark powders, dissolve in water to red to blue and blue-green solutions, and dye textiles red to blue and green tints.

13. The azo-dyestuffs the sodium salts of which correspond to the general formula

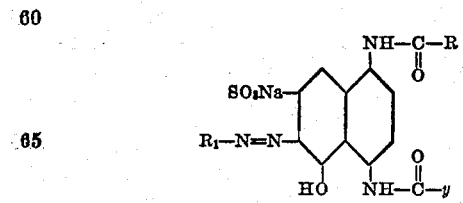

wherein R and $y$ stand for hydrogen, alkyl or aryl, and $R_1$ for the aromatic radicle of a diazo-compound, which products constitue dark powders, dissolve in water to red to blue and blue-green solutions, and dye textiles red to blue and green tints.

14. The diazo-dyestuffs the sodium salts of which correspond to the general formula

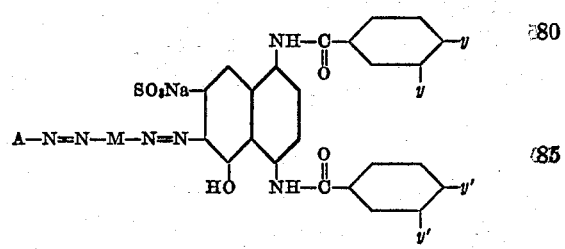

wherein A stands for the radicle of a diazo-compound, M for the aromatic radicle of a so-called middle component, $y$ and $y'$ in one case stand for hydrogen and in the other case for an $NH_2$-group, which products constitute dark powders, dissolve in water to violet to blue solutions, and dye cotton violet to blue tints, and yielding, when diazotized on the fibre and coupled with phenylmethylpyrazolone, fast blue-green to green dyeings.

15. The azo-dyestuffs the sodium salts of which correspond to the general formula

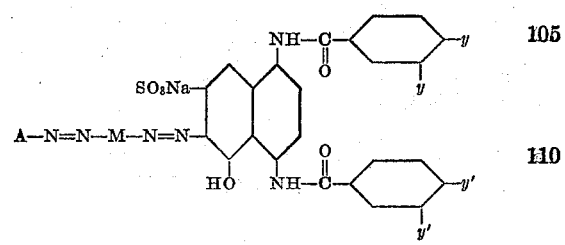

wherein A stands for a sulfonated aromatic nucleus, M for the aromatic radicle of a so-called middle component, $y$ and $y'$ in one case stand for hydrogen and in the other case for an $NH_2$-group, which products constitute dark powders, dissolve in water to violet to blue solutions, and dye cotton violet to blue tints, and yielding, when diazotized on the fibre and coupled with phenylmethylpyrazolone, fast blue-green to green dyeings.

16. The azo-dyestuffs the sodium salts of which correspond to the general formula

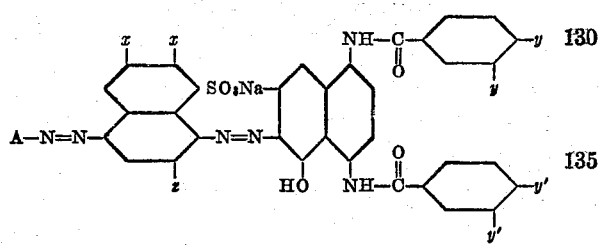

wherein A stands for a sulfonated naphthalene nucleus, $z$ for hydrogen or an O-alkyl-group, $x$ in one case for hydrogen and in the other case for hydrogen or a sulfonic group, and $y$ and $y'$ in one case stand for hydrogen and in the other case for an $NH_2$-group, which products constitute dark powders, dissolve in water to blue solutions, and dye cotton blue tints, and yielding, when diazotized on the fibre and coupled with phenylmethylpyrazolone, fast green dyeings.

17. The azo-dyestuffs the sodium salts of which correspond to the general formula

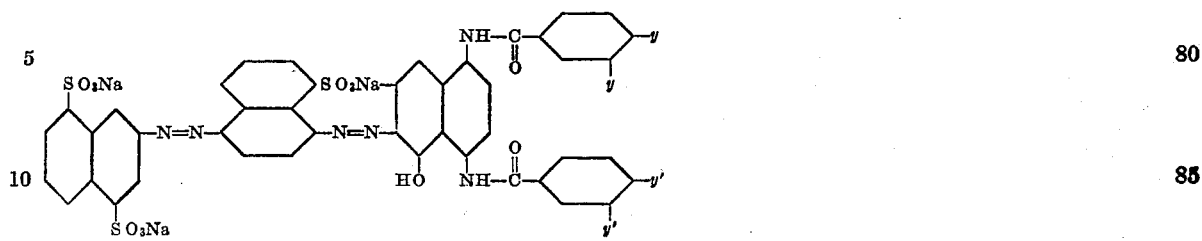

wherein $y$ and $y'$ in one case stand for hydrogen and in the other case for an NH$_2$-group, which products constitute dark powders, dissolve in water to blue solutions, and dye cotton blue tints, and yielding, when diazotized on the fibre and coupled with phenylmethylpyrazolone, fast green dyeings.

18. The azo-dyestuffs the sodium salts of which correspond to the general formula

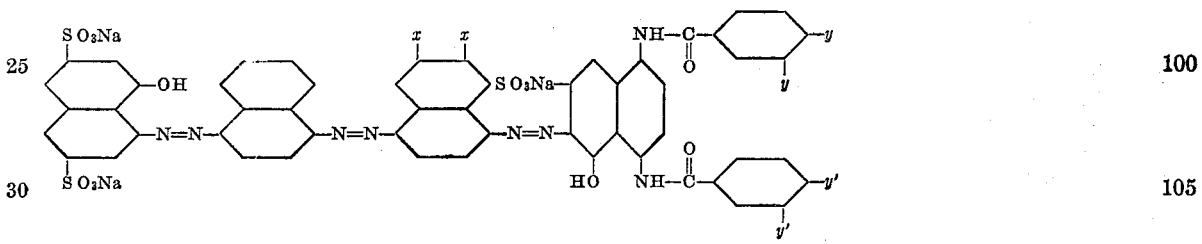

wherein $x$ in one case stands for hydrogen and in the other case for hydrogen or a sulfonic group, and $y$ and $y'$ in one case stand for hydrogen in the other case for an NH$_2$-group, which products constitute dark powders, dissolve in water to blue solutions, and dye cotton blue tints, and yielding, when diazotized on the fibre and coupled with phenylmethylpyrazolone, fast green dyeings.

EMIL EDUARD MISSLIN.
RUDOLF von CAPELLER.